United States Patent
Mueller et al.

(10) Patent No.: US 8,888,638 B2
(45) Date of Patent: Nov. 18, 2014

(54) MULTI-MODE HYBRID ELECTRIC TRANSFER CASE FOR FOUR-WHEEL DRIVE VEHICLE

(75) Inventors: Joseph G. Mueller, Clarkston, MI (US); Carl F. Stephens, Liverpool, NY (US)

(73) Assignee: Magna Powertrain of America, Inc., Troy, MI (US)

( * ) Notice: Subject to any disclaimer, the term of this patent is extended or adjusted under 35 U.S.C. 154(b) by 498 days.

(21) Appl. No.: 13/375,649

(22) PCT Filed: Jun. 3, 2010

(86) PCT No.: PCT/US2010/037204
§ 371 (c)(1),
(2), (4) Date: Dec. 1, 2011

(87) PCT Pub. No.: WO2010/141682
PCT Pub. Date: Dec. 9, 2010

(65) Prior Publication Data
US 2012/0077633 A1    Mar. 29, 2012

Related U.S. Application Data

(60) Provisional application No. 61/184,462, filed on Jun. 5, 2009.

(51) Int. Cl.
| | | |
|---|---|---|
| *F16H 37/06* | (2006.01) |
| *B60K 17/346* | (2006.01) |
| *B60K 6/387* | (2007.10) |
| *B60K 23/08* | (2006.01) |
| *B60W 10/02* | (2006.01) |
| *B60W 10/08* | (2006.01) |
| *B60K 6/365* | (2007.10) |
| *B60K 6/52* | (2007.10) |
| *B60K 6/48* | (2007.10) |
| *B60W 10/06* | (2006.01) |
| *B60W 20/00* | (2006.01) |

(52) U.S. Cl.
CPC ......... *B60K 17/3462* (2013.01); *Y02T 10/6221* (2013.01); *B60L 2240/421* (2013.01);
(Continued)

(58) Field of Classification Search
USPC ....................... 180/242, 243; 475/5, 150, 151
See application file for complete search history.

(56) References Cited

U.S. PATENT DOCUMENTS

| | | |
|---|---|---|
| 3,963,085 A | 6/1976 | Vinton |
| 4,405,029 A | 9/1983 | Hunt |
| 6,371,878 B1 | 4/2002 | Bowen |
| 6,464,608 B2 | 10/2002 | Bowen et al. |
| 6,533,692 B1 | 3/2003 | Bowen |

(Continued)

OTHER PUBLICATIONS

International Search Report and Written Opinion for PCT/US2010/037204, mailed Aug. 20, 2010; ISA/US.

*Primary Examiner* — Derek D Knight
(74) *Attorney, Agent, or Firm* — Dickinson Wright PLLC (57) ABSTRACT

A hybrid transfer case can include first and second output shafts adapted for connection to respective rear and front drivelines, a first input shaft adapted for connection to a transmission and for selective connection to the first output shaft, and a second input shaft that can be rotatably supported on the first input shaft and selectively connected to the first output shaft. The transfer case can further include a planetary gearset, a transfer system and an electric motor/generator. The planetary gearset can include a first member fixed for rotation with the first input shaft, a second member fixed for rotation with the second input shaft, and a third member. The transfer system can couple the second input shaft to the second output shaft, and the electric motor can selectively drive the third member.

20 Claims, 6 Drawing Sheets

(52) U.S. Cl.
CPC .......... *Y02T 10/642* (2013.01); *B60K 17/3467* (2013.01); *B60K 6/387* (2013.01); *B60K 23/0808* (2013.01); *B60W 10/02* (2013.01); *B60W 2510/0638* (2013.01); *B60W 10/08* (2013.01); *B60W 2510/081* (2013.01); *B60W 2510/104* (2013.01); *B60W 2510/246* (2013.01); *B60K 6/365* (2013.01); *Y02T 10/6265* (2013.01); *B60W 2540/10* (2013.01); *B60K 6/52* (2013.01); *Y02T 10/6286* (2013.01); *B60L 2240/441* (2013.01); *B60W 2510/244* (2013.01); *B60W 2540/12* (2013.01); *B60K 6/48* (2013.01); *B60W 10/06* (2013.01); *B60W 2510/0604* (2013.01); *B60W 2520/28* (2013.01); *B60L 2240/486* (2013.01); *B60W 20/00* (2013.01)
USPC .............. 475/5; 475/150; 475/151; 180/242; 180/243

(56) References Cited

U.S. PATENT DOCUMENTS

| | | | |
|---|---|---|---|
| 6,533,693 | B2 | 3/2003 | Bowen et al. |
| 6,589,128 | B2 | 7/2003 | Bowen |
| 6,648,785 | B2 | 11/2003 | Porter |
| 6,679,799 | B2 | 1/2004 | Bowen |
| 6,719,656 | B2 | 4/2004 | Bowen |
| 6,881,168 | B2 | 4/2005 | Bowen |
| 7,004,869 | B2 | 2/2006 | Porter |
| 7,125,357 | B2 | 10/2006 | Porter |
| 7,395,893 | B2 | 7/2008 | Porter |
| 7,424,924 | B2 | 9/2008 | Janson |
| 7,455,135 | B2 | 11/2008 | Janson et al. |
| 7,462,121 | B2 | 12/2008 | Janson et al. |
| 7,467,678 | B2 | 12/2008 | Tanaka et al. |
| 2006/0108166 | A1 | 5/2006 | Tanaka et al. |
| 2007/0034428 | A1 | 2/2007 | Janson |
| 2007/0093341 | A1 | 4/2007 | Supina et al. |
| 2009/0076696 | A1 | 3/2009 | Perkins et al. |

MULTI-MODE HYBRID ELECTRIC TRANSFER CASE FOR FOUR-WHEEL DRIVE VEHICLE

CROSS-REFERENCE TO RELATED APPLICATIONS

This application is a 371 U.S. National Stage of International Application No. PCT/US2010/037204, filed Jun. 3, 2010, and claims the benefit of U.S. Provisional Application No. 61/184,462, filed on Jun. 5, 2009, the disclosures of which are herein incorporated by reference in their entirety.

INTRODUCTION

The present disclosure relates generally to hybrid drive systems for motor vehicles and, more particularly, to a transfer case for use in four-wheel drive hybrid vehicles.

BACKGROUND

This section provides background information related to the present disclosure which is not necessarily prior art.

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems may suffer from several disadvantages and, for all practical purposes, are still under development. However, several different hybrid electric vehicles have recently been offered for sale. Some of the hybrid vehicles are equipped with an internal combustion engine and an electric motor that can be operated independently or in combination to drive the vehicle.

There are generally two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that may be expensive due to the componentry, required control systems, and specialized packaging requirements.

Hybrid vehicles have also been adapted to four-wheel drive vehicles and typically utilize the above-noted parallel hybrid powertrain to drive the primary wheels and a second electric motor to drive the secondary wheels. Such a four-wheel drive system may be extremely expensive and difficult to package. Thus, a need exists to develop hybrid powertrains for use in four-wheel drive vehicles that utilize many conventional powertrain components so as to minimize specialized packaging and reduce cost.

SUMMARY

This section provides a general summary of the disclosure, and is not a comprehensive disclosure of its full scope or all of its features.

In one form, a transfer case for a vehicle having an engine, a transmission, and front and rear drivelines is provided. The transfer case can include a first output shaft adapted for connection to the rear driveline, a second output shaft adapted for connection to the front driveline, and first and second input shafts. The first input shaft can be adapted for connection at a first end to the transmission and for selective connection at a second end to the first output shaft. The second input shaft can be rotatably supported on the first input shaft for rotation relative thereto and can be adapted for selective connection to the first output shaft. The transfer case can further include a planetary gear set, a transfer system and an electric motor. The planetary gear set can include a first member fixed for rotation with the first input shaft, a second member fixed for rotation with the second input shaft, and a third member. The transfer system can rotatably couple the second input shaft to the second output shaft, and the electric motor can selectively drive the third member.

In another form, a hybrid vehicle is provided. The hybrid vehicle can include a powertrain, first and second drivelines and a transfer case. The powertrain can include an internal combustion engine and an electric motor as motive power sources. The first driveline can transfer power to a first wheel and can include a first disconnect arranged to drivingly connect and disconnect the motive power sources and the first wheel. The second driveline can transfer power to a second wheel and can include a second disconnect arranged to drivingly connect and disconnect the motive power sources and the second wheel. The transfer case can include first and second output shafts and first and second input shafts. The first output shaft can be adapted for connection to the first driveline and the second output shaft can be adapted for connection to the second driveline. The first input shaft can be adapted for connection at a first end to the internal combustion engine, and for selective connection at a second end to the first output shaft. The second input shaft can be adapted for selective connection to the first input shaft. The transfer case can further include a planetary gear set and a transfer system. The planetary gear set can include a first member fixed for rotation with the first input shaft, a second member fixed for rotation with the second shaft, and a third member. The transfer system can rotatably couple the second input shaft to the second output shaft, and the electric motor can selectively drive the third member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
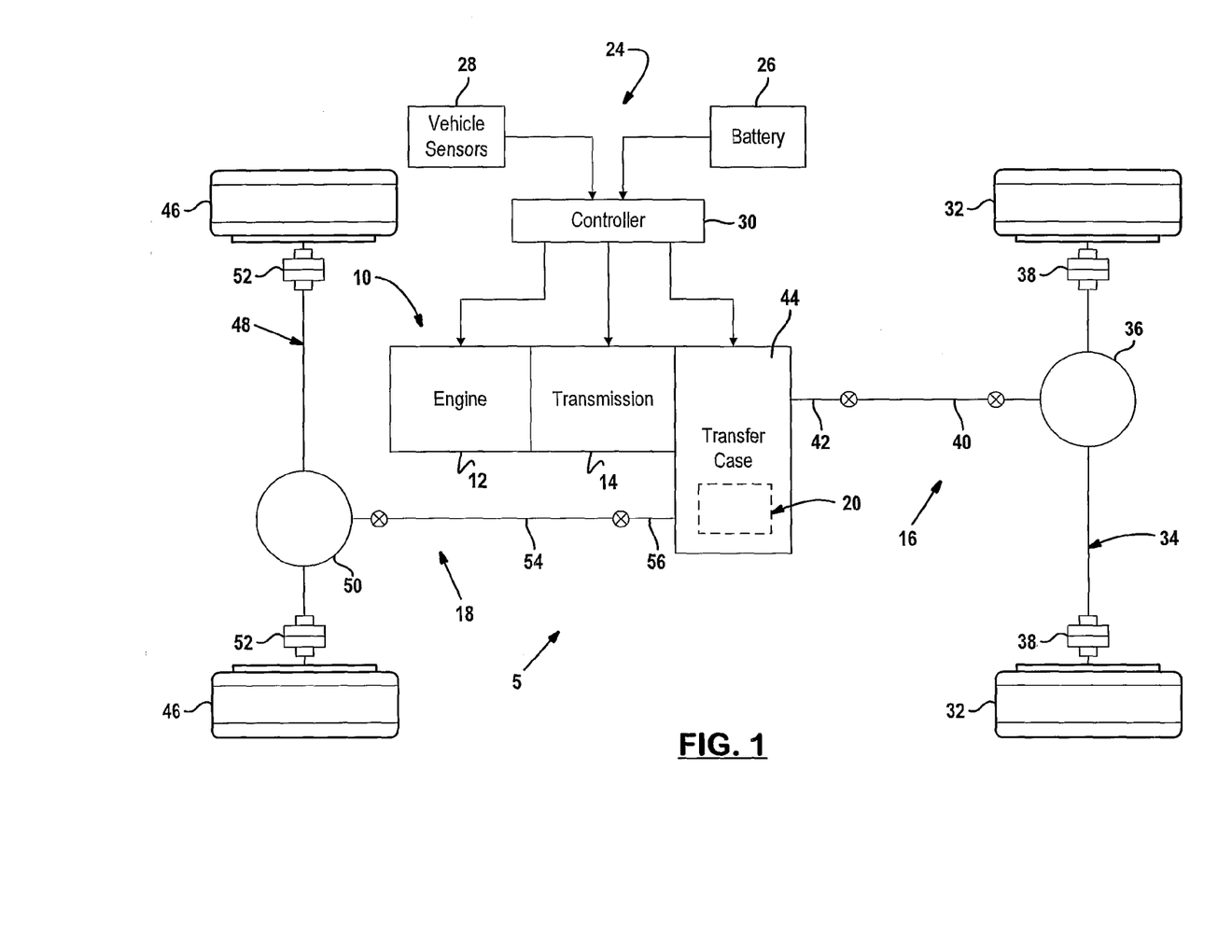
FIG. 1 is a schematic of a hybrid drive system for a four-wheel drive vehicle in accordance with the teachings of the present disclosure.

Referring to FIG. 1 of the drawings, a hybrid four-wheel drive powertrain system 5 for a hybrid motor vehicle is shown and can include a first power source 10, a transmission 14, a rear driveline 16, a front driveline 18, and a second power source 20. The first power source may include an internal combustion engine 12 and the second power source may include an electric motor/generator 22. Transmission 14 can be of any known type including, but not limited to, an automatic, manual, automated manual or continuously variable transmission. The vehicle can further include a powertrain control system 24 generally shown to include a battery 26, a group of vehicle sensors 28, and a controller 30. Rear driveline 16 can include a first pair of wheels 32 connected to a rear axle assembly 34 having a differential unit 36 and a pair of rear axle or wheel disconnects 38. Differential unit 36 can be connected to one end of a rear prop shaft 40, the opposite end of which can be connected to a first or rear output shaft 42 of a transfer case 44. Similarly, front driveline 18 can include a second pair of wheels 46 connected to a front axle assembly 48 having a differential unit 50 and a pair of front axle or wheel disconnects 52. Differential unit 50 can be connected to one end of a front prop shaft 54, the opposite end of which can be connected to a second or front output shaft 56 of transfer case 44.

Referring now primarily to FIGS. 2-5, transfer case 44 is shown schematically and can include a housing assembly 58 of the type normally adapted for bolted mounting to a casing of transmission 14, a first input shaft 60, a second input shaft 62, and a planetary gear set 64. Planetary gear set 64 can include a ring gear 66 in constant meshing engagement with a plurality of planet gears 68 which can be in constant meshing engagement with a sun gear 70. Ring gear 66 can be fixed for rotation with first input shaft 60 at one end adjacent to transmission 14. Planet gears 68 can be rotatably supported by pins 72 which can be fixed to a carrier 74. Carrier 74 can be fixed for rotation with second input shaft 62. While not intended to be limiting, it is contemplated that a reduction ratio of about 3 to 1 can be established by planetary gear set 64.

First input shaft 60 can be rotatably supported in housing 58 by bearing assemblies and adapted for direct connection at one end to an output shaft of transmission 14. First input shaft 60 can also include a hub 76 at a second end fixed for rotation with first input shaft 60 and for facilitating selective engagement with rear output shaft 42 as will be detailed herein. A plurality of teeth 77 are formed on hub 76. Second input shaft 62 can be concentrically supported on first input shaft 60 for rotation relative thereto and can include a toothed hub 78 for facilitating selective engagement with rear output shaft 42 as will also be detailed herein.

A transfer system 80 can be provided in transfer case 44 for transferring torque from second input shaft 62 to front output shaft 56. Transfer system 80 can include a first sprocket 82 fixed for rotation with second input shaft 62 and a second sprocket fixed 84 for rotation with front output shaft 56. A flexible member, such as a power chain 86, can couple the first and second sprockets 82, 84 so as to transfer drive torque from first sprocket 82 to second sprocket 84 and thus from second input shaft 62 to second output shaft 56.

Transfer case 44 can further include a first mode clutch assembly 90 and a second mode clutch assembly 92, each controlled by controller 30. First mode clutch 90, shown as an exemplary dog clutch, can include a mode sleeve 94 for selectively coupling one of the first input shaft 60 and the second input shaft 62 with rear output shaft 42. Mode sleeve 94 is fixed for rotation with and axially moveable relative to rear output shaft 42 via a splined hub 96. To selectively couple the first input shaft 60, mode sleeve 94 can be controlled to couple hub 76 with hub 96 of rear output shaft 42. Similarly, to selectively couple the second input shaft 62, mode sleeve 94 can be translated to couple hub 78 and 96. Second mode clutch 92, also shown as an exemplary dog clutch, can include a mode sleeve 98 operable to selectively couple the front output shaft 56 to a ground 100 so as to restrict front output shaft 56 from rotating.

A motor/generator clutch assembly 102 and first and second sleeves 104, 106 can also be provided in transfer case 44 for selectively coupling motor/generator 22 with sun gear 70. First and second sleeves 104, 106 can be concentrically supported on second input shaft 62 for relative rotation thereto. First sleeve 104 can be connected at one end to sun gear 70 and arranged for selective engagement by motor/generator clutch 102 at an opposite end. Second sleeve 106 can be connected to a rotor 108 of motor/generator 22 at one end and arranged for selective engagement by motor/generator clutch 102 at an opposite end. Motor/generator clutch 102, shown as an exemplary dog clutch, can be controlled by controller 30 to selectively fix rotor 108 for rotation with sun gear 70 via mode sleeve 110. It should be appreciated that while first and second mode clutches 90, 92 and electric motor/generator clutch 102 are shown as exemplary dog clutch arrangements, other suitable clutch arrangements, such as friction plate clutches or synchronizers, can be used in place of the dog clutches.

The hybrid four-wheel drive powertrain system 5 of the present disclosure can include two main power sources, namely internal combustion engine 12 and electric motor/generator 22. Power from engine 12 can be transmitted to transmission 14, which in turn, can be delivered to transfer case 44 via first input shaft 60. First input shaft 60 can drive rear output shaft 42 if first mode clutch 90 is controlled to selectively couple the respective shafts. In a parallel power transmission path, driven ring gear 66 can drive carrier 74 through planet gears 68 which in turn can drive second input shaft 62. Second input shaft 62 can then drive front output shaft 56 via transfer system 80 and/or can be selectively coupled to drive rear output shaft 42 via first mode clutch 90. The driven planet gears 68 can also drive sun gear 70 which, in turn, can selectively transmit torque to motor/generator 22 for generation via motor/generator clutch 102. Conversely, motor/generator 22 can be energized to transmit torque via rotor 108 and motor/generator clutch 102 to drive sun gear 70 to drive second input shaft 62.

Motor/generator 22 can be connected to battery 26 and can be selectively placed in one of a driving state, a charging state, and a no-load or off state by controller 30. In the drive state, motor/generator 22 can function as an electric motor driven by energy supplied by battery 26. In the charging state, motor/generator 22 can function as an electric generator with regenerative braking (brake torque electrically generated by motor/generator 22) for providing and storing energy in battery 26. In the no-Load or off state, motor/generator can be permitted to rotate freely or can be selectively disconnected from the hybrid four-wheel drive powertrain system 5 via motor/generator clutch 102.

Figure 6:
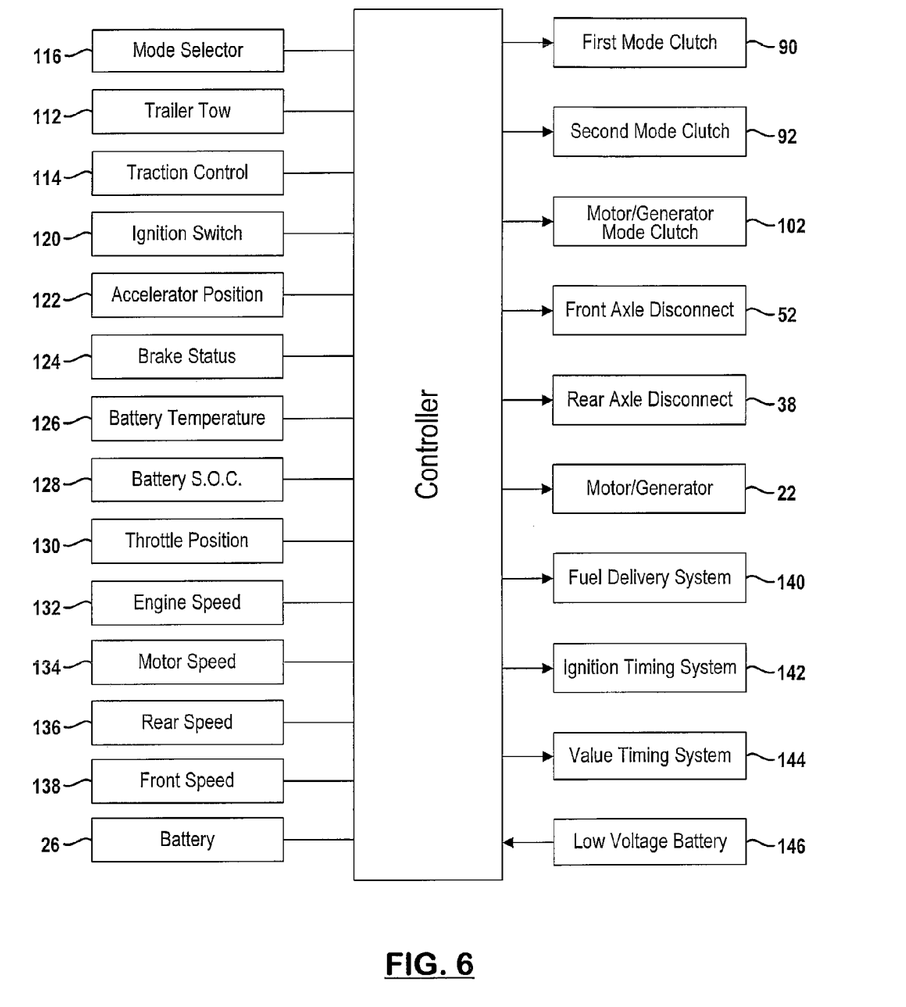
FIG. 6 is a diagram showing a control system associated with the hybrid drive system in accordance with the teachings of the present disclosure.

As noted, control system 24 can be provided for controlling operation of the hybrid four-wheel drive powertrain system 5 shown in FIG. 1. With reference to FIG. 6, controller 30 is shown to receive signals from various sensors and input devices previously identified cumulatively in FIG. 1 as vehicle sensors 28. Controller 30 can be principally comprised of a microprocessor having a central processing unit, random-access memory, read-only memory, and an input-output actuator interface. Controller 30 can perform data processing operations to execute various control routines according to control programs and/or maps stored in the read-only memory.

Controller 30 can receive data from an ignition switch 120, an acceleration position sensor 122, a brake status sensor 124, a battery temperature sensor 126, a battery state of charge sensor 128, and a throttle position sensor 130. In addition, other inputs can include an engine speed sensor 132, a motor speed sensor 134, a rear output shaft speed sensor 136, and a front output shaft speed sensor 138. Ignition switch 120 can be closed when the vehicle key is turned on. Accelerator position sensor 122 can sense a depression angle of an accelerator pedal. Brake status sensor 124 can be turned on when a brake pedal is depressed. Battery temperature sensor 126 can sense a temperature of battery 26. Battery state of charge sensor 128 can sense a charge level of battery 26. Throttle position sensor 130 can sense a degree of opening of the engine throttle valve. Engine speed sensor 132 can sense a parameter indicative of the rotary speed of a drive shaft of engine 12. Motor speed sensor 134 can sense a parameter indicative of a rotary speed of rotor 108 of motor/generator 22. Rear speed sensor 136 can sense a rotary speed of either rear output shaft 42 or rear prop shaft 40 and can further be used as an indication of vehicle speed. Front speed sensor 138 can sense a rotary speed of either front output shaft 56 or front prop shaft 54.

Based upon the operating information inputted to controller 30, a mode of operation of the hybrid transfer case 44 can be selected and controller 30 can send electronic control signals to the various power-operated controlled devices. Specifically, controller 30 can monitor and continuously control actuation of motor/generator 22, engagement of front and rear wheel disconnects 52, 38, operation of first and second mode clutches 90, 92, operation of electric motor/generator clutch 102, and various operator selected vehicle operation options such as a trailer tow 112 and traction control 114 option. Additionally, controller 30 can monitor and control various engine management systems for controlling the speed and torque generated by engine 12. These systems can include a fuel delivery system 140, an ignition timing system 142, and a valve timing system 144. A low voltage auxiliary battery 146 may serve as the power supply for controller 30.

Figure 2:
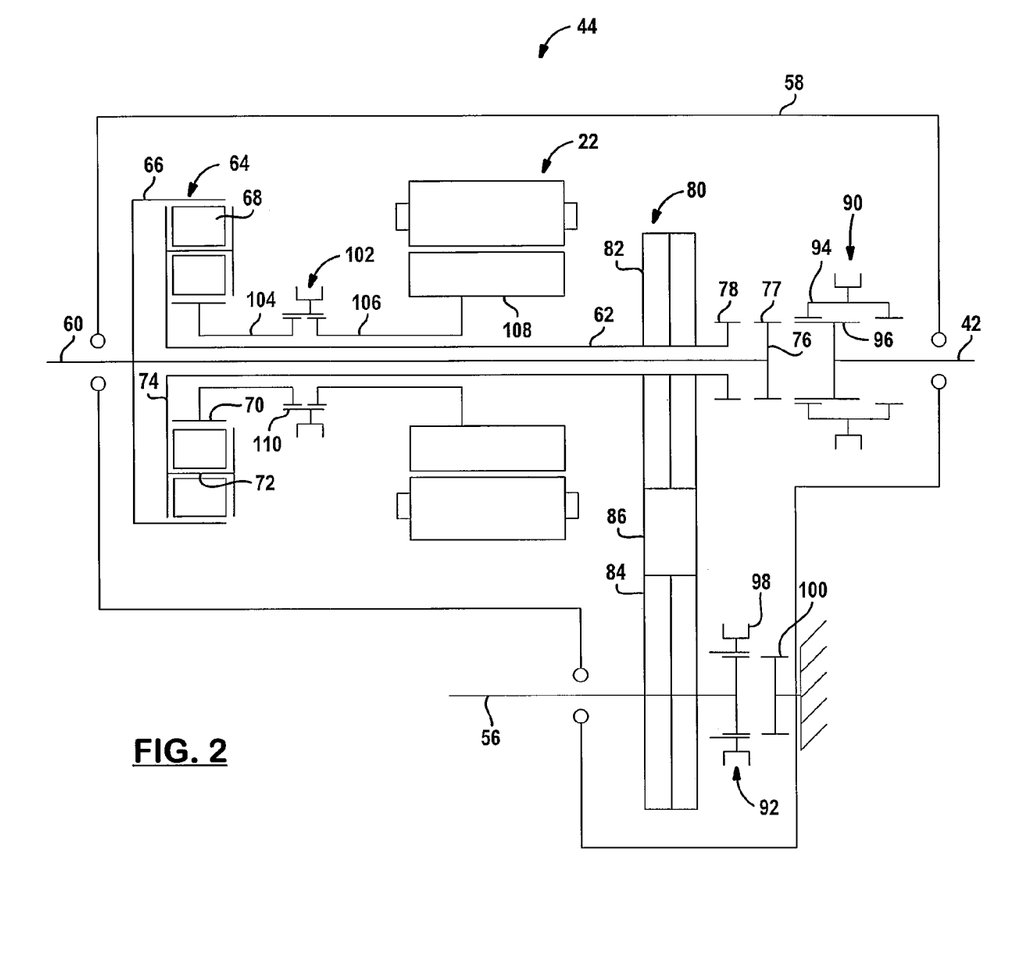
FIG. 2 is a schematic view of a transfer case associated with the hybrid drive system of FIG. 1 and shown in a first mode of operation in accordance with the teachings of the present disclosure.

The hybrid four-wheel drive powertrain system 5 of the present disclosure can include four primary modes of operation, namely a front wheel drive mode (FWD mode), a rear wheel drive mode (RWD mode), an all wheel drive or power augmentation mode (AWD mode), and a part-time four wheel drive mode (4WD mode). With particular reference to FIG. 2, the FWD mode of operation will now be discussed in greater detail. In the FWD mode, motive power can be supplied solely by electric motor/generator 22 to drive the front output shaft 56 to drive front axle 48 and front wheels 46. More specifically, engine 12 can be turned off and transmission 14 can be in a locked state thereby fixing first input shaft 60 and ring gear 66 from rotating. Motor/generator clutch 102 can be in the engaged state to transmit rotary driving power from rotor 108 of motor/generator 22 to drive sun gear 70. Driven sun gear 70 can then drive carrier 74 through planet gears 68 against fixed ring gear 66. Driven carrier 74 can drive second input shaft 62 which in turn can drive transfer system 80 and front output shaft 56. In this configuration, second mode clutch 92 can be disengaged from ground 100 to allow front output shaft 56 to rotate, and first mode clutch 90 can be disengaged from the first and second input shafts 60, 62. Front axle disconnects 52 can be in a connected state to transmit the motive power to the front wheels 46 and rear axle disconnects 38 can be in either a connected or a disconnected state. While optional in this mode, opening or disengaging the rear axle disconnects 38 can allow rear wheels 32 to rotate without requiring rear axle 34 to rotate thereby reducing friction and serving to improve fuel economy.

It is contemplated that the FWD mode can be used for launching the vehicle as well as for low speed driving and for a city driving cycle that would typically involve start and stop driving. The motor/generator 22 can also be used in the FWD mode for regeneration when not driving the vehicle, such as during motor braking or coasting. In addition, by using motor/generator 22 for the city driving cycle, emissions typically generated by an internal combustion engine during acceleration events normally associated with city driving can be substantially reduced, if not completely eliminated.

Figure 3:
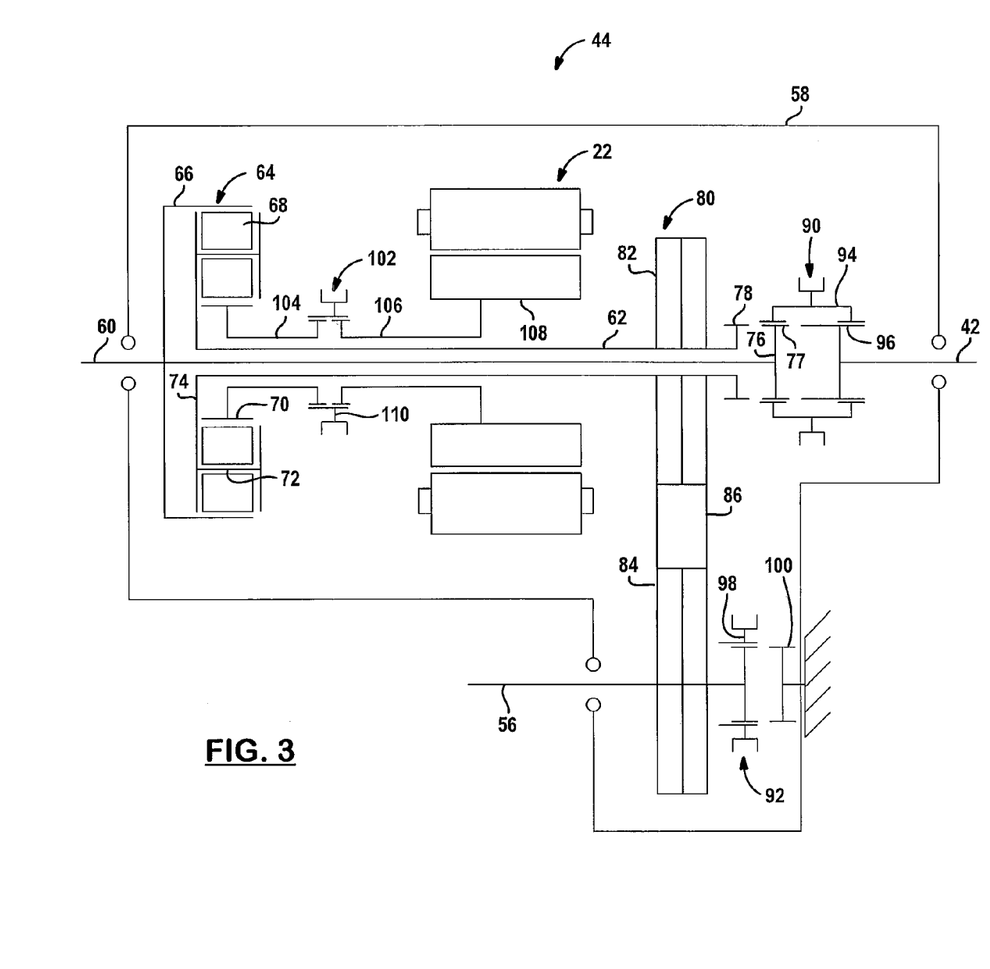
FIG. 3 is a schematic view of the transfer case associated with the hybrid drive system of FIG. 1 and shown in a second mode of operation in accordance with the teachings of the present disclosure.

Turning now to FIG. 3, the AWD mode will now be discussed in greater detail. In the AWD mode, motive power can be supplied by both engine 12 and motor/generator 22 to drive rear wheels 32 and front wheels 46. In this configuration, engine 12 through transmission 14 can drive first input shaft 60. Mode clutch 90 can be operated to selectively engage mode sleeve 94 with hub 76 and hub 96 to transmit driving power to rear output shaft 42. Motor/generator 22 can drive sun gear 70 in a manner similar to the FWD mode discussed above, except that motor/generator 22 can be controlled by controller 30 to drive sun gear 70 relative to the driven ring gear 66 to drive second input shaft 62 and front wheels 46. Torque output from motor/generator 22 can be controlled as a function of engine 12 input torque to control torque splitting between front and rear axles 48, 34. For an exemplary torque split of approximately fifty percent to front axle 48 and fifty percent to rear axle 34, electric motor/generator torque can be approximately twenty percent of engine 12 input torque. This torque ratio is obtained by the gear ratio provided by planetary gear set 64 operating in the manner described. Other torque ratios may alternatively be provided. In addition, front and rear wheel disconnects 52, 38 can be in a locked or engaged configuration so as to transmit motive power from front and rear axles 48, 34 to front and rear wheels 46, 32.

The AWD mode of operation can be manually selected by a vehicle operator, such as by selecting the AWD mode using mode selector switch 116, or by selecting the trailer tow 112 or traction control 114 operating options when additional traction and/or power augmentation may be desired. Conversely, the AWD mode of operation can also be automatically selected by the controller 30 based on predetermined criteria or events such as detected wheel slippage, detected hill climbing, and/or for transitioning between the FWD and RWD modes of operation of the hybrid transfer case 44 as will be detailed. If the AWD mode is selected by controller 30 as opposed to being manually selected by a vehicle operator, the motor/generator 22 can be controlled to operate in an on-demand configuration where engine 12 provides primary input torque to drive front and rear wheels 46, 32 and electric motor/generator 22 is selectively engaged via electric motor/generator clutch 102 by controller 30 for additional torque input. Controller 30 can also selectively engage/disengage motor/generator 22 in the AWD on-demand configuration to charge battery 26 as may be required when electric motor/generator 22 is not in a driving state.

Figure 4:
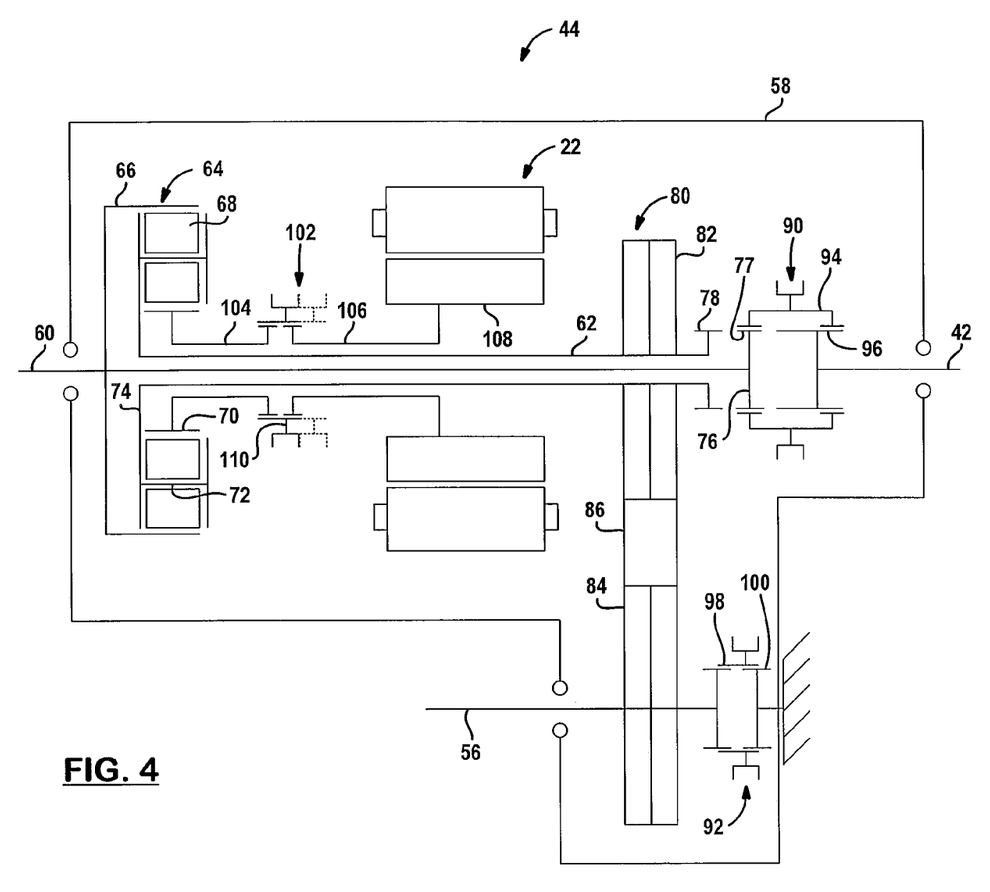
FIG. 4 is a schematic view of the transfer case associated with the hybrid drive system of FIG. 1 and shown in a third mode of operation in accordance with the teachings of the present disclosure.

Turning now to FIG. 4, the RWD mode will now be discussed in greater detail. In the RWD mode, motive power can be supplied solely by engine 12 to drive rear wheels 32. In addition, the RWD mode can also used as a generation mode to charge battery 26. In this configuration, motive power can be supplied to rear wheels 32 in the manner discussed above with respect to the AWD mode. In addition, second mode clutch 92 can be controlled to selectively engage front output shaft 56 to ground 100 via mode sleeve 98 to provide a reaction for planetary carrier 74 as will be detailed. Front axle disconnects 52 can be in the open or disengaged mode to permit front wheels 46 to rotate while front output shaft 56 is prevented from rotating. Locking front output shaft 56 via mode clutch 92 selectively restricts second input shaft 62 and thus carrier 74 from rotation. With carrier 74 fixed, as ring gear 66 is driven by engine 12, sun gear 70 can be correspondingly driven which, in turn, can drive motor/generator 22 via engaged motor/generator mode clutch 102. Driven motor/generator 22 can then charge battery 26 while being monitored by controller 30. When controller 30 determines that battery 26 is fully charged via battery state of charge sensor 128, motor/generator clutch 102 can be controlled to selectively disengage motor/generator 22 from sun gear 70, and thereby place motor/generator 22 in the no-load or off state.

The RWD mode of operation can be used as the primary mode of operation for providing motive power at highway speeds. By having the FWD mode and using motor/generator 22 for launching the vehicle in the FWD mode as discussed above, engine 12 can be optimized for economy performance by, for example, using a lower displacement engine. In addition, the electric motor/generator can be selectively used to charge battery 26 during the RWD mode of operation. Finally, if any power augmentation is needed during RWD operation, either the user can manually select or controller 30 can automatically call for power augmentation (through one of the previously discussed sensors or switches) thereby transitioning the hybrid transfer case 44 into the AWD mode with power augmentation by motor/generator 22.

Figure 5:
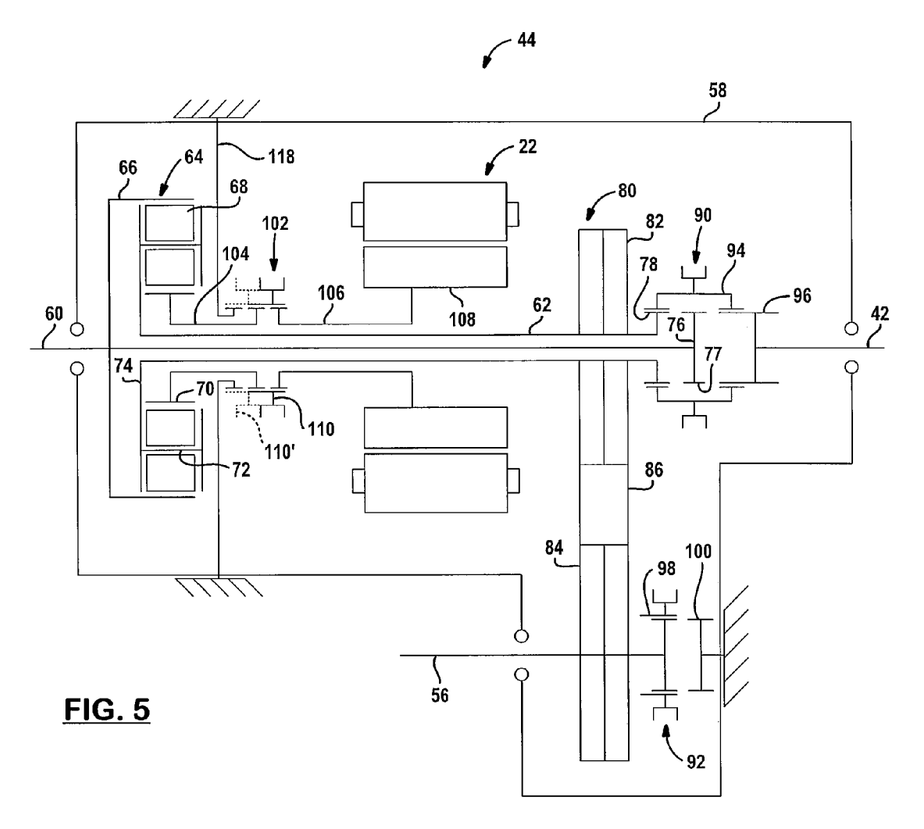
FIG. 5 is a schematic view of the transfer case associated with the hybrid drive system of FIG. 1 and shown in a fourth mode of operation in accordance with the teachings of the present disclosure.

With reference to FIG. 5, the 4WD mode will be discussed in greater detail. In this mode, motive power can be supplied to the front wheels 46 and the rear wheels 32 by both engine 12 and motor/generator 22 or either engine 12 or motor/generator 22. In the 4WD mode, with any configuration of power sources, the first mode clutch 90 can be controlled to engage second input shaft 62 with rear output shaft 42, and the second mode clutch 92 can be disengaged from ground 100. In addition, the front and rear axle disconnects 52, 38 can be in a locked or engaged state in the 4WD mode. In a 4WD configuration where input torque can be supplied by both engine 12 and motor/generator 22, engine 12 can drive carrier 74 through ring gear 66 and motor/generator 22 can drive carrier 74 through sun gear 70, with motor/generator clutch 102 controlled to engage motor/generator 22 to sun gear 70 via mode sleeve 110. Carrier 74 can then drive second input shaft 62 which, in turn, can drive front output shaft 56 through transfer system 80 and rear output shaft 42 through mode clutch 90.

In a 4WD mode configuration where torque can be supplied by only engine 12, motor/generator clutch 102 can be controlled to selectively fix sun, gear 70 by moving mode sleeve 110 to a position 110' thereby coupling sleeve 104 to a ground 118. Engine 12 can then drive carrier 74 through ring gear 66 which, in turn, can drive second input shaft 62 and front and rear output shafts 56, 42 as detailed above. In a 4WD mode configuration where torque input can be supplied by only motor/generator 22, transmission 14 can be in a locked state so as to fix ring gear 66 from rotating. Motor/generator clutch 102 can also be controlled to engage motor/generator 22 to sun gear 70 and motor/generator 22 can then drive carrier 74 through sun gear 70 against fixed ring gear 66. Carrier 74 can then drive second input shaft 62 to drive front and rear output shafts 56, 42 as detailed above. In this configuration, motor/generator 22 can be in a drive state when driving sun gear 70 and in a regeneration state when the vehicle is coasting or braking.

The hybrid vehicle of the present disclosure can advantageously use the operating modes of the hybrid transfer case 44 under normal or typical driving conditions to launch the vehicle with the FWD mode, transition through the AWD mode, and operate at higher steady-state speeds with the RWD mode. More specifically, the hybrid four-wheel drive powertrain system 5 can be configured to launch in the FWD mode using only motor/generator 22 for motive power as discussed above. The vehicle can then continue in the FWD mode through approximately 30 miles per hour, where the hybrid transfer case 44 can then transition to the AWD mode. During this transition, which can take place between approximately 30-40 miles per hour, engine 12 can be started and brought up to an appropriate rotational speed by controller 30 and then first mode clutch 90 can be controlled to engage first input shaft hub 76 via mode sleeve 94. If the rear wheel disconnects 38 were optionally disconnected during operation in the FWD mode, they can be reconnected or locked by controller 30 prior to engaging rear output shaft 42 with first input shaft 60 as discussed above.

If the vehicle continues to accelerate above 40 miles per hour, then the hybrid transfer case 44 can transition to the RWD mode for speeds above approximately 40 miles per hour. For the transition to the RWD mode, electric motor/generator 22 can be slowed to a stop by controller 30 while motive power is supplied to rear wheels 32 by engine 12. A command from controller 30 can then be issued to release front axle disconnects 52 prior to having second mode clutch 92 engage front output shaft 56 via mode sleeve 98 so as to lock front output shaft 56 to ground 100 for the RWD mode configuration. During the RWD mode, electric motor/generator can be selectively engaged and disengaged by controller 30 to recharge battery 26 as discussed above.

It should be appreciated that the AWD mode can also be selected at any speed in the FWD or the RWD mode as may be desired for additional traction control and/or power augmentation. For example, if the AWD mode is manually selected by a vehicle operator or automatically selected by controller 30 responsive to a predetermined threshold condition, such as detected wheel slippage, controller 30 controls motor/generator 22 for synchronization to second input shaft 62 via motor/generator mode clutch 102. Controller 30 can also instruct second mode clutch 92 to disengage front output shaft 56 from ground 100 and instruct front axle disconnects 52 to reconnect or lock front wheels 46 to axle 48. It should also be appreciated that if the AWD mode or the 4 WD mode is manually selected by the vehicle operator, the vehicle can launch in the manually selected mode (i.e., AWD or 4 WD) in place of the FWD mode.

The foregoing description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A transfer case for a vehicle having an engine, a transmission, and front and rear drivelines, comprising:
   a first output shaft adapted for connection to the rear driveline;
   a second output shaft adapted for connection to the front driveline;
   a first input shaft adapted for connection at a first end to the transmission, and for selective connection at a second end to the first output shaft;
   a second input shaft rotatably supported on the first input shaft for rotation relative hereto, the second input shaft adapted for selective connection to the first output shaft;
   a planetary gear set having a first member fixed for rotation with the first input shaft, a second member fixed for rotation with the second input shaft, and a third member;
   a transfer system rotatably coupling the second input shaft to the second output shaft; and
   an electric motor for selectively driving the third member.

2. The transfer case of claim 1, further comprising:
   a first mode clutch for independently coupling each of the first and second input shafts with the first output shaft;
   a second mode clutch or selectively coupling the second output shaft to ground; and
   a third mode clutch for selectively coupling the electric motor to the third member.

3. The transfer case of claim 2, wherein the first mode clutch is operable in a released state to release the first and second input shafts from driven engagement with the first output shaft and is further operable in a first applied state to couple the first input shaft with the first output shaft and in a second applied state to couple the second input shaft with the first output shaft, wherein the second mode clutch is operable in an applied state to couple the second output shaft to ground and is further operable in a released state to release the second output shaft from ground, and wherein the third mode clutch is operable in a released state to release the electric motor from engagement with the third member and is further operable in an applied state to couple, the electric motor for driven engagement with the third member.

4. The transfer case of claim 3, further comprising a control system operable to control actuation of the electric motor and the first, second and third mode clutches, the control system including a controller and sensors for detecting operating characteristics of the vehicle and sending sensor and switch input to the controller.

5. The transfer case of claim 4, wherein the control system permits selection of a front wheel drive operating mode, a rear wheel drive operating mode, an all wheel drive operating mode, and a part-time four wheel drive operating mode.

6. The transfer case of claim 3, wherein a front wheel drive mode is established when the first and second mode clutches are operating in their released states, the third mode clutch is operating in its applied state and the engine is off such that the electric motor drives the third member to transmit motive power to the second output shaft.

7. The transfer case of claim 3, wherein an all wheel drive mode is established when the first mode clutch is operating in its first applied state coupling the first input shaft to the first output shaft, the second mode clutch is operating in its released state, and the third mode clutch is operating in its applied state such that motive power is transmitted to the first and second output shafts by the engine and the electric motor.

8. The transfer case of claim 7, wherein the third mode clutch is controlled to selectively operate in its applied state such that motive power is transmitted to the first and second output shafts by the engine and selectively by the electric motor to define an on-demand all wheel drive mode.

9. The transfer case of claim 3, wherein a rear wheel drive mode is established when the first mode clutch is operating in its first applied state and the second mode clutch is operating in its applied state such that motive power is transmitted to the first output shaft by the engine, and wherein the third mode clutch is controlled to selectively operate in its applied state such that the electric motor can selectively operate in a generation mode.

10. The transfer case of claim 3, wherein a part-time four wheel drive mode is established when the first mode clutch is operating in its second applied state coupling the second input shaft to the rear output shaft and thereby locking the first output shaft to the second output shaft, and the second mode clutch is operating in its released state such that motive power is transmitted to the first and second output shafts, and wherein the third mode clutch is controlled to selectively operate in its applied state such that the motive power transmitted to the first and second output shafts is supplied by the electric motor, the engine, or both of the engine and the electric motor.

11. The transfer case of claim 10, wherein the third mode clutch is operable in an additional applied state to couple the third member to ground.

12. The transfer case of claim 1, wherein the transfer system includes a first sprocket fixedly attached to the second input shaft, a second sprocket fixedly attached to the second output shaft, and a power chain rotatably coupling the first and second sprockets.

13. The transfer case of claim 1, wherein the first member includes a ring gear, the second member includes a carrier and the third member includes a sun gear.

14. A hybrid vehicle, comprising:
   a powertrain having an internal combustion engine and an electric motor as motive power sources;
   a first driveline for transferring power to a first wheel, the first driveline including a first disconnect arranged to drivingly connect and disconnect the motive power sources and the first wheel;

a second driveline for transferring power to a second wheel, the second driveline including a second disconnect arranged to drivingly connect and disconnect the motive power sources and the second wheel; and a transfer case including a first output shaft adapted for connection to the first driveline, a second output shaft adapted for connection to the second driveline, a first input shaft adapted for connection at a first end to the internal combustion engine and for selective connection at a second end to the first output shaft, a second input shaft adapted for selective connection to the first output shaft, a planetary gear set having a first member fixed for rotation with the first input shaft, a second member fixed for rotation with the second input shaft and a third member, a transfer system rotatably coupling the second input shaft, to the second output shaft, wherein the electric motor selectively drives the third member.

15. The hybrid vehicle of claim 14 further including a first mode clutch for independently coupling each of the first and second input shafts with the first output shaft;

a second mode clutch for selectively coupling the second output shaft to ground;

a third mode clutch for selectively coupling the electric motor to the third member; and a control system for controlling actuation of the first and second disconnects, the first, second and third mode clutches, the internal combustion engine and, the electric motor.

16. A hybrid electric transfer case for a four-wheel drive motor vehicle having a powertrain and first and second drivelines, the transfer case comprising:

a first output shaft adapted for connection to the first driveline for driving a set of first wheels;

a second output shaft adapted for connection to the second driveline for driving a set of second wheels;

a first input shaft adapted for connection to the powertrain;

a second input shaft;

a transfer assembly coupling said second input shaft to said second output shaft;

a reduction gearset having a first member fixed for rotation with said first input shaft, a second member fixed for rotation with said second input shaft, and a third member;

an electric motor;

a first clutch for selectively coupling said first output shaft to one of said first and second input shafts; and a second clutch for selectively coupling said electric motor to said third member of said reduction gearset.

17. The hybrid electric transfer case of claim 16 wherein said first clutch is operable in a first mode to disconnect said first output shaft from both of said first and second input shafts, a second mode to connect said first output shaft to said first input shaft, and a third mode to connect said first output shaft to said second input shaft, and wherein said second clutch is operable in a first mode to disconnect said electric motor from said third member and in a second mode to connect said electric motor to said third member.

18. The hybrid electric transfer case of claim 17 wherein said second clutch is further operable in a third mode to disconnect said electric motor from said third member and connect said third member to a stationary member, wherein a third clutch is operable in a first mode to permit rotation of said second output shaft and in a second mode to prevent rotation of said second output shaft.

19. The hybrid electric transfer case of claim 17 adapted to establish a front wheel drive mode, an all wheel drive mode, and a four-wheel drive mode, wherein said front wheel drive mode is established when said first clutch is in its first mode and said second clutch is in its first mode, wherein said all wheel drive mode is established when said first clutch is in its second mode and said second clutch is in its first mode, and wherein said four wheel drive mode is established when said first clutch is in its third mode and said second clutch is in its first mode.

20. The hybrid electric transfer case of claim 16 wherein said second input shaft is arranged to surround said first input shaft, wherein said electric motor includes a rotor shaft surrounding said second input shaft, wherein said reduction gearset includes a planetary gearset having a ring gear fixed for rotation with said first input shaft, a sun gear, planet gears meshed with said ring gear and said sun gear, and a carrier rotatably supporting said planet gears and which is fixed for rotation with said second input shaft, and wherein said second clutch is operable for selectively coupling said sun gear to said rotor shaft.

* * * * *